United States Patent [19]

Spitzer et al.

[11] Patent Number: 4,891,712

[45] Date of Patent: Jan. 2, 1990

[54] METHOD OF CONDUCTING MARKETING RESEARCH BY USING VIDEO TAPE PRODUCTIONS

[75] Inventors: Rich A. Spitzer; Melanie A. Mumper, both of Toledo, Ohio; Karen A. Stanley, Chesterfield, Mo.

[73] Assignee: NFO Research, Inc., Toledo, Ohio

[21] Appl. No.: 128,110

[22] Filed: Dec. 3, 1987

[51] Int. Cl.⁴ .............................................. H04N 5/782
[52] U.S. Cl. .................................... 358/335; 360/118; 360/55
[58] Field of Search ....................... 358/335, 341, 343; 360/19.1, 55, 66, 80, 118; 369/12

[56] References Cited

U.S. PATENT DOCUMENTS

| | | |
|---|---|---|
| 3,612,774 | 10/1971 | Wiklund . |
| 4,017,905 | 4/1977 | Convertine et al. . |
| 4,395,740 | 7/1983 | Yuen et al. ..................... 360/33.1 X |
| 4,466,584 | 8/1984 | Chevalier et al. . |
| 4,482,104 | 11/1984 | Saito . |
| 4,656,548 | 4/1987 | Pfefferkorn et al. . |
| 4,660,115 | 4/1987 | Westfall et al. . |
| 4,660,116 | 4/1987 | Westfall et al. . |

FOREIGN PATENT DOCUMENTS

| | | |
|---|---|---|
| 52-9404 | 1/1977 | Japan . |
| 58-125277 | 7/1983 | Japan . |
| 2119753 | 11/1983 | United Kingdom . |
| 84/01657 | 4/1984 | World Int. Prop. O. . |

*Primary Examiner*—Robert L. Richardson

[57] ABSTRACT

A new use of manufacture is disclosed. The marketing research method includes preparing a video tape for viewing by a member of a defined research sample. The tape is placed into a cassette and supplied to the member. In some cases the tape is viewed on a one-time basis. The survey material is collected and analyzed.

2 Claims, No Drawings

METHOD OF CONDUCTING MARKETING RESEARCH BY USING VIDEO TAPE PRODUCTIONS

BACKGROUND OF THE INVENTION

The present invention relates to a new use of a known manufacture and specifically a new use of a cassette having erasing means.

One embodiment of a cassette having erasing means is shown in Japanese Application No. 6056/1982 bearing Publication No. 58-125277 dated July 26, 1983. The Japanese publication discloses the broad concept of placing a magnet within a cassette to erase recorded information immediately after playing the tape.

Marketing research data has been collected for numerous reasons in the past. The reasons can be as broad as new product testing or political candidate evaluations. Often, the testing is done using carefully prepared written questionnaires, along with a description (written, printed, oral or real life) of a product, service or concept which the respondent is to evaluate.

For example, a product sample and the questionnaire is delivered to a member of a defined group and that member responds to the questionnaire which is then collated and analyzed.

SUMMARY OF THE INVENTION

The present invention is directed to a marketing research method which uses video tape rather than written, printed, oral or actual product or service descriptions, advertising, spokespersons, or any other test stimuli. The benefit of a videotape presentation is to clearly and completely describe the product or service in a consistent manner, with the most realistic demonstration, not available with the other passive methods. After a tape is supplied to a member of a defined group, the member is allowed to view the tape and respond to a questionnaire or telephone interview. The tape may only be viewed once. Either by mechanical means which lock the rewind mechanism or preferably, by erasing the tape after one-time viewing, the member is prevented from a second viewing of the video production. In some cases, it is important to the survey that only the first impression of the member is analyzed. The erasing procedure also provides security to the client so that the product/service demonstrated cannot be readily made known to others or copied.

DESCRIPTION OF THE PREFERRED METHOD

In the method according to the present invention, a video tape is first produced. The video tape preferably includes audio and visual signals. The video tape production is directed to, for example, a new product which a manufacturer is considering offering to the marketplace. After production of the video tape, it is placed into a video cassette. The video cassette including the tape is supplied to a member of a defined research sample.

The member views the tape on a one-time basis. Sometimes more than one household member views the tape. In some cases the tape is restricted to one-time viewing by a mechanical lock-up of the rewind mechanism or the reels within the cassette or, preferably, the tape is erased after the one-time viewing.

Questions are asked of the member either on the video tape itself or in a supplemental written questionnaire and the resulting survey material is collected from the member of the research sample. Other times the material is collected through a follow-up telephone interview. After collection, the results are analyzed and supplied to the manufacturer who has requested the product survey.

What we claim:

1. A marketing research method comprising, preparing a video tape having images for viewing by a defined research sample; placing the tape in a video cassette having erasing means; supplying the cassette and tape to a member of the defined research sample; viewing the tape on a one time basis by the member of the defined research sample; erasing the tape while within the cartridge; and collecting the survey material from the member of the defined research sample.

2. A marketing research method, according to claim 1, including the step of analyzing the collected survey material.

* * * * *